United States Patent [19]
Braun et al.

[11] 3,817,410
[45] June 18, 1974

[54] FIELD CUTTER SPOUT STABILIZER

[76] Inventors: Melvin D. Braun; Gerald L. Braun; John F. Braun, all of Miltonvale, Kans. 67466

[22] Filed: Apr. 17, 1973

[21] Appl. No.: 351,998

[52] U.S. Cl. ............................................. 214/42 A
[51] Int. Cl. ............................................. B65g 67/24
[58] Field of Search ............ 193/3; 302/37, 4, 9, 10; 214/42 A

[56] References Cited
UNITED STATES PATENTS
2,789,705   4/1957   Eberly............................. 214/42 A

*Primary Examiner*—Evon C. Blunk
*Assistant Examiner*—Hadd Lane
*Attorney, Agent, or Firm*—D. Paul Weaver

[57] ABSTRACT

A field cutter spout stabilizer and means for supporting the spout is disclosed whereby the discharge end of the spout is capable of horizontal and vertical movement to accommodate for turning and/or up and down movement of the cutter, as the cutter is drawn through a field, so that the spout will be properly positioned at all times with respect to an opening in a trailing wagon for delivery of material through the opening.

12 Claims, 5 Drawing Figures

FIELD CUTTER SPOUT STABILIZER

BACKGROUND OF THE INVENTION

At the present time field cutters are used to cut various crops on agricultural land. Such cutters ordinarily include cutting mechanism which chops up the crop material into a condition in which it may be conveyed, by means of air currents, through a spout to a dump wagon. Thus, the field cutter ordinarily includes a vertical discharge tube and a blower for impelling cut material therethrough.

A dump wagon is connected rearwardly of the cutter by means of a trailer tongue to be drawn thereby. The dump wagon now commonly used ordinarily includes a box-like body and a roof comprising two inclined sections which meet in an apex with the end edges of the roof and the upper end edge of the front wall of the body defining an opening into which cut material is discharged. A spout for conveying cut material from the cutter to the wagon comprises a short vertical leg that is joined to a longer horizontal arm by a bend. The lower end of the leg is attached to a turntable on the cutter and communicates with the discharge tube thereof. The turntable is normally provided with a worm gear which is turned by means of a hand crank to position the discharge end of the spout with relation to the opening in the wagon, and once this positioning has taken place the relative position of the discharge end of the spout is fixed with respect to the opening.

From the very nature of its intended use, the field cutter and dump wagon must be drawn over terrain which often is rough and includes ditches and furrows, and the cutter and wagon must also negotiate turns. These conditions often cause the discharge end of the spout to become disaligned with respect to the wagon opening whereby the cut material is discharged outside of the wagon, with attendant loss of material.

OBJECTS OF THE INVENTION

With the foregoing conditions in mind, the present invention has in view the following objectives.

1. To provide, in an assembly of a field cutter, a trailing dump wagon having an opening through which cut material is discharged into the wagon and a spout for conveying cut material from the cutter to said opening, apparatus for supporting and stabilizing said spout whereby the discharge end of the spout will be constantly aligned with respect to the opening.

2. To provide, in an assembly of the type noted in which the cutter includes a vertical discharge tube, a spout having a vertical leg, the lower end of which is rotatably and pivotally mounted on the upper end of the discharge tube and having a horizontal brace or arm one end of which is pivotally connected to the vertical leg and the other end of which is swivelably connected to a hinged ladder-like support or stabilizer that has one end mounted on the trailer tongue and has its other end connected to and supporting the spout.

3. To provide, in an assembly of the type noted a ladder-like support or stabilizer comprising three hingedly connected sections with the uppermost section being connected to a horizontal arm of the spout and being adjustable relative to the middle section.

4. To provide, in an assembly of the character described, a support arm comprising two struts in diverging relation with one end of the arm being pivotally connected to the vertical spout extension at the horizontal pivot which connects the spout thereto and the other end of the arm being connected to the ladder-like support substantially midway of its vertical extent by a ball joint.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objectives are achieved by providing in an assembly of a field cutter including a vertical discharge tube, a dump wagon connected to the cutter by a trailer tongue and having a forward opening through which cut material is to be charged into the wagon and a spout for conveying cut material from the cutter to the wagon, a spout of novel construction and a support and stabilizer for the spout. The spout comprises a relatively short vertical leg terminating in a bell-like member and to which a tubular spout extension is connected on a horizontal axis. The lower end of this tubular extension is rotatably mounted on the upper end of the discharge tube of the cutter by means of a turntable. The spout also includes a longer generally horizontal arm which is connected to the vertical leg by a bend.

The spout support and stabilizer comprise two basic elements. One of these is a ladder-like vertical support and the other is a horizontal support arm. The ladder-like support comprises three hingedly connected sections, the lowermost of which is pivotally connected on a horizontal axis to a pedestal that is welded or bolted to the tongue substantially midway between the cutter and wagon. The uppermost section has its upper end connected to the horizontal arm of the spout and its lower end is pivotally connected to the middle section, with means also being provided for height adjustment.

The horizontal support arm comprises two struts in diverging relation with the ends of the struts which are spaced apart being pivotally connected to the tubular extension of the spout leg on the same bolts which connect the bell-like member to the spout extension. The other end of this arm, where the struts meet, is connected to the upper end of the lower section of the ladder-like support by a ball joint.

For a full and more complete understanding of the invention, reference may be had to the following description and the accompanying drawings wherein.

DESCRIPTION OF THE PREFERRED EMBODIMENT

Figure 1:
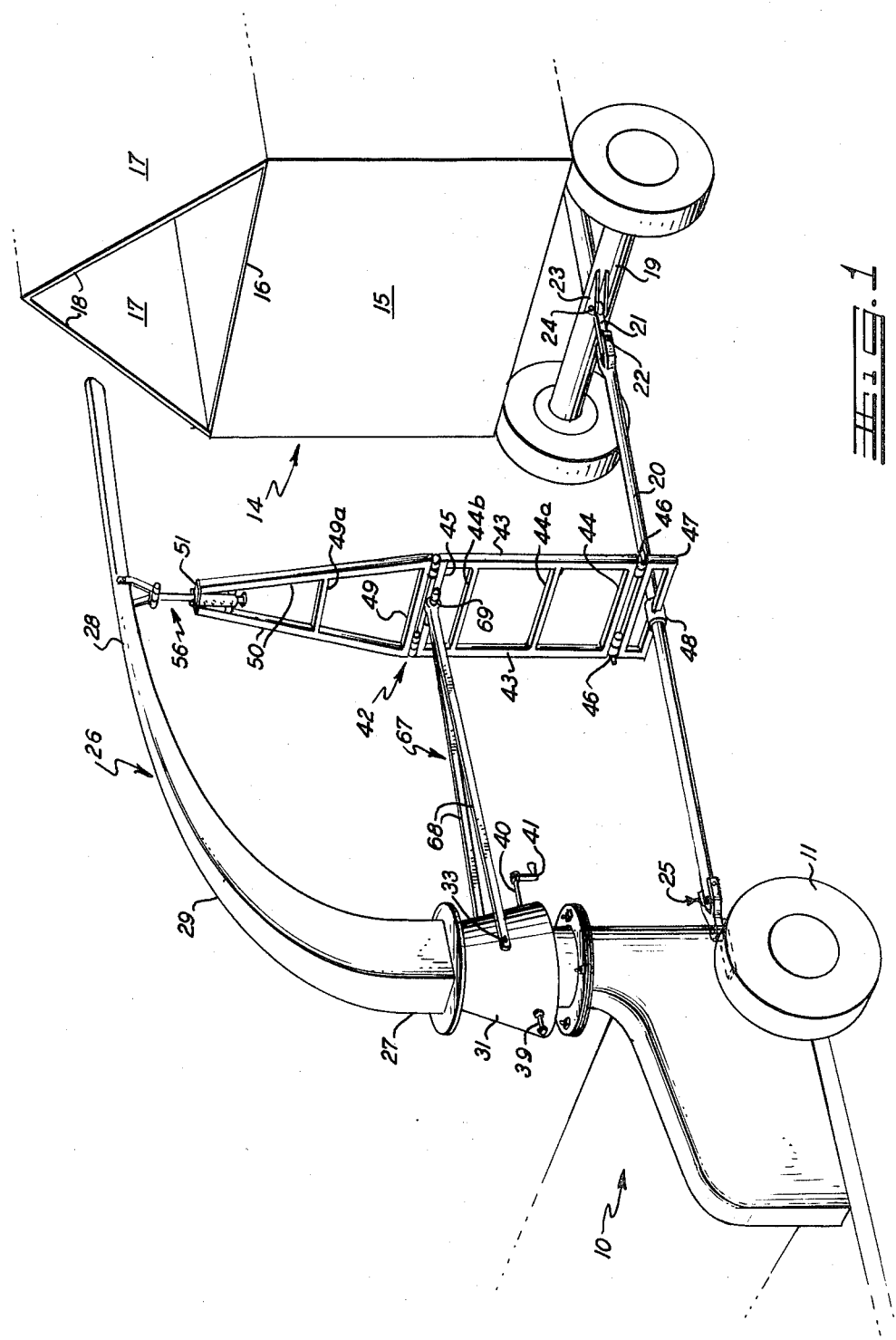
FIG. 1 is a perspective of a portion of a field cutter, the forward end part of a dump wagon, and the spout support or stabilizer therefor of this invention.

Referring now to the drawings wherein like reference characters denote corresponding parts and first more particularly to FIG. 1 a portion of a field cutter is represented at 10. This field cutter includes a plurality of wheels one of which is shown at 11 which provides for its rolling over farm land. The field cutter 10 will include cutting implements and a blower which are not a part of the present invention and hence are not herein disclosed. It is sufficient to point out that a portion of a blower casing is shown at 12 in FIG. 2 and provides a vertical discharge tube 13. A dump wagon is designated generally 14 and includes a box-like body presenting a forward wall 15 having an upper edge 16. Dump wagon 14 also includes a roof comprising inclined sections 17 presenting forward edges 18. The edges 16 and 18 define an opening through which cut material is discharged into wagon 14.

Wagon 14 also includes a forward axle 19. The rear end of tongue 20, which is bifurcated, is pivotally connected to the front end of a bar 21 by a horizontally disposed pin 22 which passes through openings in the bar 21 and the bifurcated end of tongue 20. The rear end of bar 21 is connected to a pair of tabs 23 integrally secured to axle 19 by a pin 24 passing through openings formed in the rear end of bar 21 and in tabs 23. The forward end of tongue 20 is connected to cutter 10 by a ball hitch indicated generally at 25.

Figure 2:
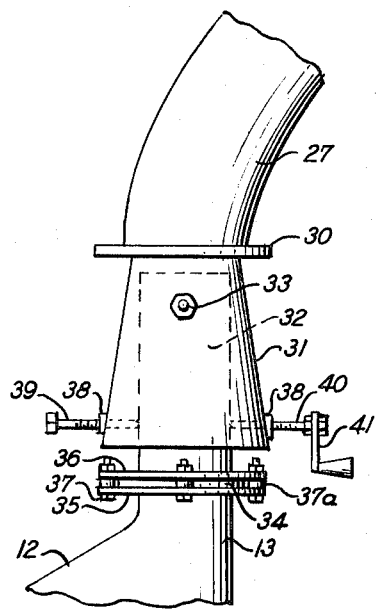
FIG. 2 is a detailed view in side elevation showing the lower end of the vertical leg of the spout as it is mounted on the discharge tube of the cutter.
Figure 3:
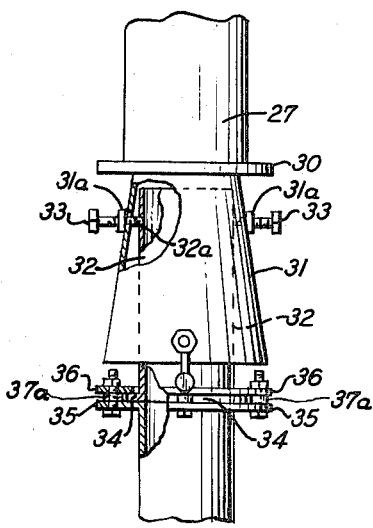
FIG. 3 is a view similar to FIG. 2, but taken normal to the plane of FIG. 2.

A spout is referred to in its entirety by the reference character 26. It includes a vertical leg 27 which is comparatively short and a longer horizontal arm 28 which is integrally connected to leg 27 by a bend 29. Referring now more particularly to FIGS. 2 and 3, leg 27 is formed with an annular flange 30 connected thereto, as by welding. Above this flange the leg 27 is of square horizontal cross section and this same configuration continues through the bend 29 and horizontal arm 28 although the tubular space is gradually restricted as depicted in FIG. 1. Below flange 30 the leg 27 takes the form of a conical bell-like member 31, the smaller upper end of which is connected to flange 30 as by welding. A pair of lugs 31a are secured to the outer face of bell 31, adjacent to its narrow upper end on opposite sides thereof. Received in this so-called bell 31 is a tubular extension 32 which is cylindrical. Threaded pivot pins 33 pass through lugs 31a and through openings in bell-like member 31 for engagement in threaded bores 32a provided in tubular extension 32 to establish a pivotal relation between bell 31 and extension 32 on a horizontal axis. Pivot pins 33 are diametrically opposed with respect to each other. Extension 32 extends below the wide end of bell 31 and its lower end is secured to an annular ring-like member 34. Extension 32 and ring-like member 34 may be integrally joined or formed as separate elements which can be joined as by welding or by bolts.

The upper end of the cutter discharge tube 13 is formed with an outwardly extending annular flange 35, the upper face of which is engaged by ring-like member 34 having a diameter less that that of flange 35. A retaining ring 36 bears against the upper surface of ring-like member 34 and is held thereagainst by a plurality of bolt and nut assemblies 37 passing through openings in flange 35 and retaining ring 36, with a plurality of spacers 37a being disposed between flange 35 and retaining ring 36 to form a turntable assembly. It will be understood that these bolt and nut assemblies are tightened sufficiently to maintain the assembled relation and yet permit rotative movement of extension 32 relative to discharge tube 13.

Adjacent to its lower wider end and in opposed diametric relation, a pair of lugs 38 are secured to the outer face of bell 31. The axis of lugs 38 is disposed 180° out of phase with respect to the axis of lugs 33. A set screw 39 is threaded through one of these lugs and an aligned opening in bell 31 and its inner end, is adapted to engage extension 32 for a purpose to be later described. Another set screw 40 is received in the other lug 38, passing through an aligned opening in bell 31, and being adapted to engage extension 32 likewise. The outer free end of screw 40 is provided with a hand crank 41.

Referring now again to FIG. 1 a vertical ladder-like support and stabilizer is designated generally 42. It includes a lowermost section of generally rectangular shape having side rails 43, a bottom cross bar 44, intermediate cross bars 44a and 44b, and an upper cross bar 45. Cross bar 44 is pivotally connected by pivot pins 46, which are removable, to a pedestal 47 which is secured to tongue 20 substantially midway its extremities in any preferred manner as by bolts or welding, with a welded joint being indicated at 48.

At this point it might be well to note that the tongue used to connect a dump wagon to a field cutter may be of various configurations and devices other than the pedestal 47 which is welded to the tongue 20 may be employed to secure the lower end of section 43 to the tongue.

Figure 4:
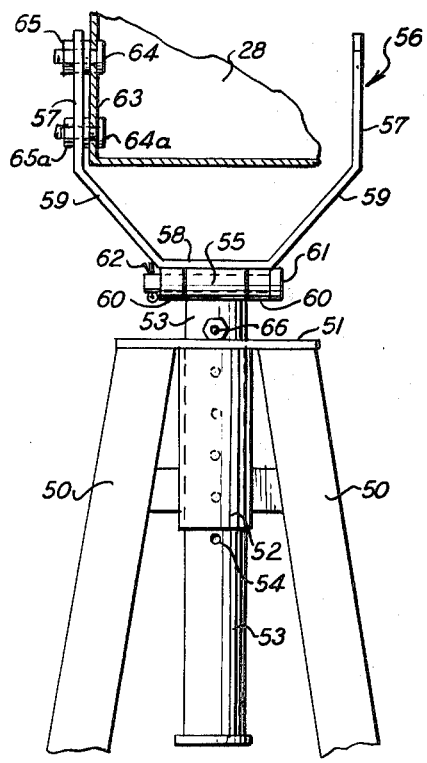
FIG. 4 is a detailed elevation on an enlarged scale of the adjustable connection between the uppermost section of the ladder-like support and the middle section thereof.
Figure 5:
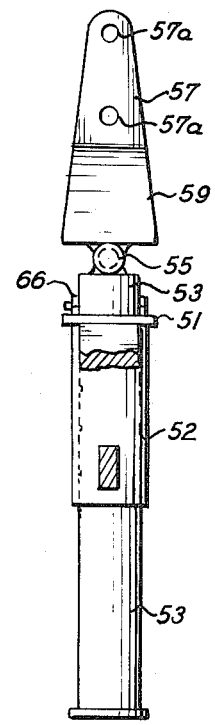
FIG. 5 is a view similar to FIG. 4, but taken on a plane normal to that of FIG. 4.

Stabilizer 42 also includes a middle section defined by bottom cross bar 49, an intermediate cross bar 49a, and converging side bars 50 which are connected at upper ends by cross plate 51. The overall length of the middle section is greater than that of the lower section. Referring now more particularly to FIGS. 4 and 5, a sleeve 52, of rectangular cross section, is integrally connected to and depends from plate 51. Slidably received in this sleeve 52 is a bar 53 formed with a plurality of spaced openings 54. The upper end of bar 53 is provided with a hollow cylindrical sleeve 55 having an opening therethrough. The uppermost section of stabilizer 42 is designated generally 56. It comprises a pair of spaced side arms 57 which are connected to a bottom cross bar 58 by inclined members 59. Depending from the lower face of bar 58 are a pair of hollow cylindrical sleeves 60 having openings therethrough which are spaced apart and receive therebetween sleeve 55. These openings in sleeves 60 are aligned with the opening in sleeve 55 and passing through these aligned openings is a pivot pin 61 which is held in position by a cotter pin 62. The horizontal arm 28 includes a pair of opposed side walls one of which is indicated at 63. Each of these side walls 63 is formed with a pair of openings which align with a pair of openings 57a in each of the side arms 57. Bolts 64 and 64a pass through each set of these aligned openings and are secured by nuts 65 and 65a. Thus the upper end of section 56 is fixedly connected to horizontal arm 28. An abutment pin 66 is passed through one of the openings 54 in bar 53 to determine the relative position of upper section 56 relative to the middle section. Obviously, this pin may be drawn out of the opening in which it is received, the bar 53 moved in sleeve 52 into a position bringing another of the openings 54 into position above plate 51 whereupon the pin is inserted into the opening so selected.

A horizontal support arm is designated generally 67. It comprises a pair of struts 68 in diverging relation. These struts 68 have horizontally disposed openings adjacent the wider end through which pivot pins 33 pass, thereby pivotally mounting the struts 38 on pins 33. These struts meet at the end remote from pivot pins 33 and where they meet they are joined to the top bar 45 of middle section 43 by a ball joint 69.

OPERATION

While the manner in which the subject field cutter spout stabilizer functions is believed to be obvious from the illustrations of the drawings and description of parts set forth above, it is briefly described as follows:

Set screws 39 and 40 are first loosened to permit bell 31 to rotate relative to extension 32 upon the horizontal axis of pins 33. Thus up and down movement in a vertical plane is provided for the horizontal arm 28 of the spout. At the same time rotative movement of the spout is provided by turntable 34. Thus as cutter 10 is moved over the terrain of a piece of farm land and wagon 14 is drawn therebehind the horizontal arm 28 of the spout may move relative to the cutter in both vertical and horizontal planes so that the discharge end of the spout will remain in proper relation to the opening defined by edges 16 and 18 of the wagon. The ladder-like stabilizer 42 which comprises the hingedly connected sections, the pivotal mounting of the bell 31 on pivot pin 33 and the connection of the stabilizer to the pivot pins through support arm 67 will prevent vertical disalignment of the cutter with respect to the wagon. For example, if the cutter proceeds up an incline while the wagon is still on level ground, the bell 31 will pivot forwardly causing spout 26 to tilt rearwardly while the lower section of stabilizer 42 moves forwardly by virtue of its pivotal connections with the pedestal 47 and the upper section. Support arm 42 limits the amount of forward movement of the lower section of stabilizer 42. Conversely, if the cutter is going down an incline, the bell 31 will pivot rearwardly and the spout 26 will tilt forwardly, with the lower section of the stabilizer 42 moving rearwardly. Horizontal displacement of the discharge end of spout 26 with respect to the opening in wagon 14, during turning movement of the cutter 10, is avoided by virtue of the spout 26 being mounted on turntable 34 and by the connection of the spout 26 to the trailer tongue 20 through stabilizer 42. As the cutter 10 turns, the turntable 34 permits the spout 26 to remain aligned with the trailer tongue 20 so as to remain in proper delivery position with respect to the opening in wagon 14.

Should it be desired to either render the stabilizer 42 ineffective or remove it from the tongue, set screws 39 and 40 are tightened so that their inner ends clampingly engage extension 32 thus inhibiting pivotal movement of bell 31 relative to extension 32. This will take the weight off the support or off stabilizer 42 whereupon pins 46 may be removed to allow for lower section 43 and the middle section being removed. At the same time, the struts 68 would be disconnected from the pivots 33.

While a preferred specific embodiment is herein disclosed, it is to be clearly understood that the invention is not to be limited to the exact construction, devices and mechanisms illustrated and described because various modifications of these details may be provided in putting the invention into practice.

What is claimed is:

1. In a field cutter and dump wagon assembly including a field cutter having a vertical discharge tube, a dump wagon connected to said field cutter by a tongue and having a forward opening into which cut material is to be discharged into the wagon and a spout for conveying the cut material from said discharge tube, said spout having a vertical leg and a horizontal arm, the improvement comprising a spout support and stabilizer consisting of:
   a. a spout extension having a top end and a bottom end disposed between said vertical leg of said spout and said discharge tube;
   b. means pivotally connecting said vertical leg of said spout to said spout extension adjacent its top;
   c. means rotatably connecting said bottom end of said spout extension to said vertical discharge tube;
   d. hinged stabilizer means disposed between and connected to said horizontal arm of said spout and said tongue; and
   e. a horizontally disposed support member having a pair of opposed ends, one of said ends being pivotally connected to said first-named pivot means and the other of said ends being pivotally connected to said stabilizer means intermediate the ends thereof.

2. The spout support and stabilizer of claim 1 wherein said means pivotally connecting said vertical leg of said spout to said spout extension comprises:
   an outwardly and downwardly flared bell-like member having opposed upper and lower ends with the upper end being connected to the bottom of said vertical leg of said spout, and
   a pair of oppositely disposed pivot pins secured on said tubular extension adjacent its top end, said bell-like member having a pair of openings therethrough adjacent its upper end through which said pivot pins pass whereby said spout can pivot forwardly and rearwardly with respect to the line of travel of said cutter.

3. A spout support and stabilizer as set forth in claim 2 wherein said means rotatably connecting said bottom end of said spout extension to said vertical discharge tube comprises:
   a turntable assembly including a ring-like member secured to the bottom end of said spout extension,
   an outwardly extending annular flange secured on said discharge tube of said cutter, said ring-like member being disposed on top of and in abutting relation with said flange, and
   means securing said ring-like member to said flange for rotatable movement thereon.

4. A spout support and stabilizer as set forth in claim 2 wherein said means rotatably connecting said bottom end of said spout extension to said vertical discharge tube consists of a turntable assembly, and
   wherein said hinged stabilizer means consists of a lower section having opposed upper and lower ends, a middle section having opposed upper and lower ends, and an upper section having opposed upper and lower ends, said middle section being longer than said lower section;

first hinge means disposed between and connecting said lower end of said lower section to said tongue;

second hinge means disposed between and connecting said upper end of said lower section to the lower end of said middle section;

third hinge means disposed between and connecting the upper end of said middle section to the lower end of said upper section; and connection means fixedly securing the upper end of said upper section to said horizontal arm of said spout.

5. A device as set forth in claim 4, further including cooperating height adjustment means secured on said upper end of said middle section and said lower end of said upper sections for adjusting the height of said stabilizer means.

6. A device as set forth in claim 4 wherein said horizontally disposed support member is composed of a pair of struts that are spaced apart at said one end and have openings therethrough through which said pivot pins pass, said struts diverging toward and being joined together at said other end, and ball joint means secured in cooperating relation on said other end of said support member and on the upper end of said lower section of said stabilizer means for permitting upward or downward movement of said support member.

7. A device as set forth in claim 5 wherein said horizontally disposed support member is composed of a pair of struts that are spaced apart at said one end and have openings therethrough through which said pivot pins pass, said struts diverging toward and being joined together at said other end, and ball joint means secured in cooperating relation on said other end of said support member and on the upper end of said lower section of said stabilizer means for permitting upward or downward movement of said support member.

8. A device as set forth in claim 1 further comprising stop means mounted on said means pivotally connecting said vertical leg of said spout to said spout extension adjacent its lower end for stopping pivotal movement of said pivotal connecting means.

9. A device as set forth in claim 2 further comprising stop means mounted on said means pivotally connecting said vertical leg of said spout to said spout extension adjacent its lower end for stopping pivotal movement of said pivotal connecting means.

10. A device as set forth in claim 9 wherein said stop means comprises a pair of diametrically oppositely disposed set screws having opposed inner and outer ends which are mounted on and extend through said bell-like member for engagement of said inner ends of said screws against said spout extension.

11. A device as set forth in claim 10 wherein said set screws extend through said bell-like member adjacent its lower end to engage said spout extension adjacent its bottom end and wherein the axis of said set screws is disposed 180° out of phase with respect to the axis of said pivot pins.

12. A device as set forth in claim 1 wherein said tongue has opposed front and rear ends, a ball joint assembly disposed between and connecting said front end of said tongue to said cutter, the rear end of said tongue being bifurcated and having a pair of horizontally aligned openings passing therethrough, a bar having opposed front and rear ends, said front ends of said bar having a horizontally disposed opening therethrough, said opening being adapted to be aligned with said horizontal openings in said tongue, a pivot pin adapted to pass through and be secured in said aligned horizontal openings, said bar having a vertically disposed opening therethrough adjacent the rear end thereof, a tab mounted on the front end of said wagon, said tab having a vertically disposed opening therethrough adapted to be aligned with said vertically disposed opening in said rear end of said bar, and a pivot pin disposed in said vertically aligned openings.

* * * * *